United States Patent
Goto et al.

(10) Patent No.: US 10,104,652 B2
(45) Date of Patent: Oct. 16, 2018

(54) TRANSMISSION APPARATUS

(71) Applicant: Sharp Kabushiki Kaisha, Sakai, Osaka (JP)

(72) Inventors: Jungo Goto, Sakai (JP); Osamu Nakamura, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/543,010

(22) PCT Filed: Dec. 22, 2015

(86) PCT No.: PCT/JP2015/085752
§ 371 (c)(1),
(2) Date: Jul. 12, 2017

(87) PCT Pub. No.: WO2016/114078
PCT Pub. Date: Jul. 21, 2016

(65) Prior Publication Data
US 2018/0007665 A1 Jan. 4, 2018

(30) Foreign Application Priority Data
Jan. 13, 2015 (JP) ................................. 2015-003770

(51) Int. Cl.
H04W 72/04 (2009.01)
H04W 52/38 (2009.01)
(Continued)

(52) U.S. Cl.
CPC ......... H04W 72/042 (2013.01); H04W 52/38 (2013.01); H04W 72/0473 (2013.01);
(Continued)

(58) Field of Classification Search
CPC .......... H04W 72/042; H04W 72/0473; H04W 72/12; H04W 52/38; H04W 52/146;
(Continued)

(56) References Cited

U.S. PATENT DOCUMENTS 8,018,855 B2 9/2011 Englund et al.
8,837,381 B2 9/2014 Englund et al.
(Continued)

FOREIGN PATENT DOCUMENTS

WO 2008/115110 A1 9/2008
WO 2014/090200 A1 6/2014
WO 2014/135126 A1 9/2014

OTHER PUBLICATIONS

3GPP, TS22.368 V11.6.0 (Sep. 2012), 3rd Generation Partnership Project; Technical Specification Group Services and System Aspects; Service requirements for Machine-Type Communications (MTC); Stage 1(Release 11).

Primary Examiner — Ian N Moore
Assistant Examiner — Brian T Le
(74) Attorney, Agent, or Firm — ScienBiziP, P.C.

(57) ABSTRACT

In M2M communication, data transmission is performed 4 msec after control information for dynamic scheduling is received from a base station apparatus, and the data transmission that needs immediacy has more overhead. In a case where a transmission apparatus performs data transmission to a reception apparatus, there are a first transmission mode in which a data signal based on a transmission parameter included in the received control information is transmitted, and a second transmission mode in which the control signal information is not received, and the data signal is transmitted without the reception apparatus being notified of a transmission timing of the data signal. In a case where transmission of an SR is possible and in a case where data communication is possible with the first transmission mode and the (Continued)

second transmission mode, the transmission apparatus configures different transmission powers in accordance with the transmission modes.

8 Claims, 10 Drawing Sheets

(51) Int. Cl.
| | | |
|---|---|---|
| H04W 4/00 | (2018.01) | |
| H04L 5/00 | (2006.01) | |
| H04W 72/12 | (2009.01) | |
| H04W 4/70 | (2018.01) | |

(52) U.S. Cl.
CPC ........... *H04L 5/0048* (2013.01); *H04W 4/005* (2013.01); *H04W 4/70* (2018.02); *H04W 72/12* (2013.01)

(58) Field of Classification Search
CPC ..... H04W 52/325; H04W 4/70; H04W 4/005; H04W 74/006; H04L 5/0048; H04L 5/005; H04L 5/0051
See application file for complete search history.

(56) References Cited

U.S. PATENT DOCUMENTS

| | | |
|---|---|---|
| 9,532,375 B2 | 12/2016 | Englund et al. |
| 2010/0103833 A1 | 4/2010 | Englund et al. |
| 2010/0113057 A1 | 5/2010 | Englund et al. |
| 2011/0044275 A1* | 2/2011 | Ishii .................... H04W 52/325 370/329 |
| 2012/0099545 A1* | 4/2012 | Han ...................... H04L 1/0028 370/329 |
| 2014/0185495 A1* | 7/2014 | Kuchibhotla ........... H04L 5/001 370/281 |
| 2014/0192767 A1 | 7/2014 | Au et al. |
| 2014/0254544 A1 | 9/2014 | Kar Kin Au et al. |
| 2014/0334414 A1 | 11/2014 | Englund et al. |
| 2016/0323911 A1 | 11/2016 | Au et al. |

\* cited by examiner

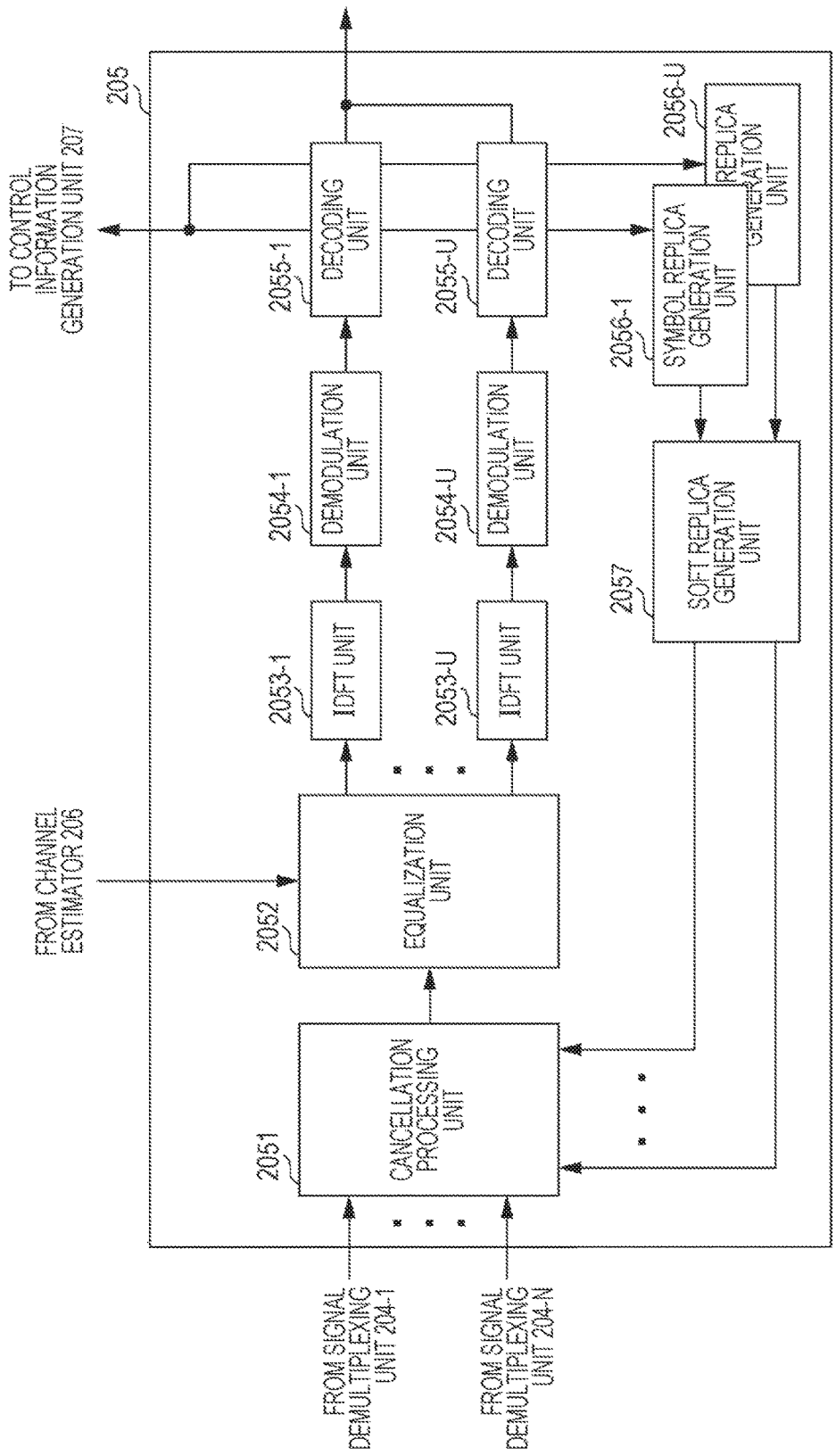

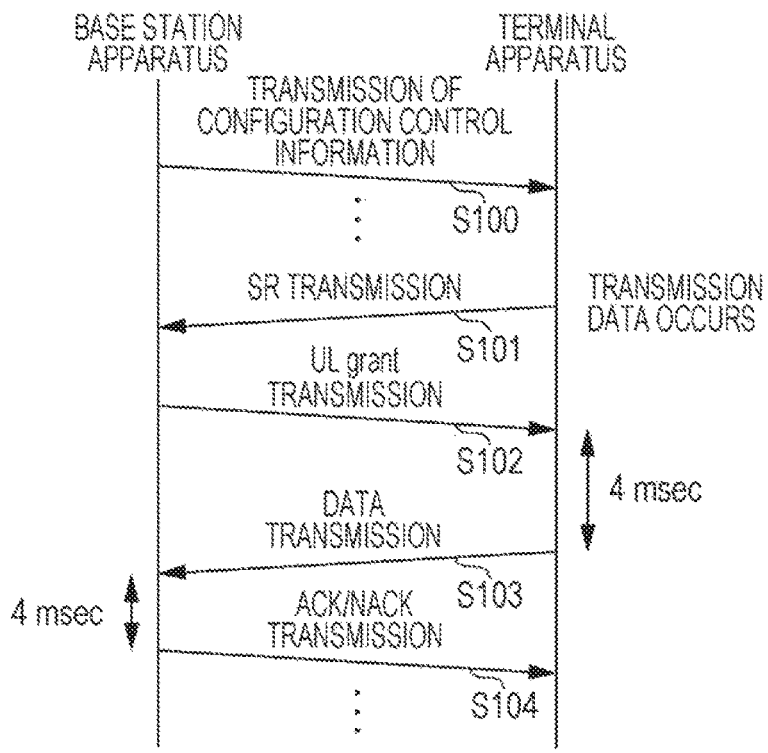
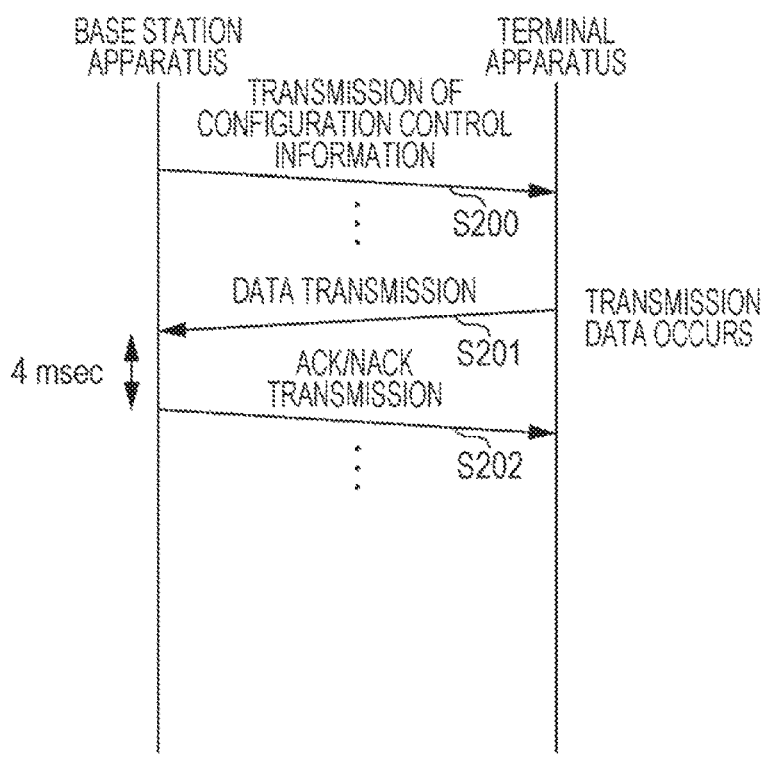

TRANSMISSION APPARATUS

TECHNICAL FIELD

The present invention relates to a transmission apparatus.

BACKGROUND ART

In recent years, Machine-to-Machine (M2M) Communication has been discussed in which apparatuses communicate with each other autonomously through a communication network. For example, 3rd Generation Partnership Project (3GPP) discusses standardization of M2M communication technologies as Machine Type Communication (MTC) (NPL 1).

In the M2M communication, various types of devices may be connected to a network. In the M2M communication, an M2M terminal autonomously transmits collected data without involving a human being. Accordingly, it is assumed that the number of M2M terminals that are connected to a base station apparatus is markedly great, and the base station apparatus needs to be able to accommodate more terminal apparatuses. In addition, it is assumed that generally, a size of data to be transmitted is small in each M2M terminal. Consequently, when control information for dynamic scheduling is transmitted in the same manner as in a cellular system that is used in the related art, a proportion of the transmission of the control information to the data transmission by each M2M terminal is relatively increased. Accordingly, an amount of control information increases along with an increase in the number of M2M terminals, and therefore, a reduction in the amount of control information also becomes more important.

On the other hand, specifications of Semi-Persistent Scheduling (SPS) for allocating a periodic resource are established in a Long Term Evolution (LTE) system. Using the SPS in the M2M communication eliminates the need for transmitting control information for the dynamic scheduling for each data transmission by the M2M terminal.

CITATION LIST

Non Patent Literature

NPL 1: 3GPP, TS22.368 V11.6.0, "Service requirements for Machine-Type communications (MTC)," September 2012

SUMMARY OF INVENTION

Technical Problem

However, in a case where the data transmission in the M2M communication occurs aperiodically, if the transmission is performed only at a periodic transmission timing allocated with the SPS, there is a problem in that overhead necessary for the data transmission increases. In a case where the dynamic scheduling is used, the data transmission, though an amount of control information is large, that needs lower overhead than in the SPS is possible. However, in the case where data in the M2M communication occurs and then the M2M terminal transmits a Scheduling Request (SR), and the control information (Grant) for the dynamic scheduling is received from the base station apparatus and then Frequency Division Duplex (FDD) (also referred to as a frame structure type 1) is performed, there is a problem in that the data transmission is performed 4 msec later and data transmission that needs immediacy may have more overhead.

In view of the situations described above, the present invention is to provide a communication method of realizing a reduction in an amount of control information in M2M communication and a reduction in overhead that is necessary for data transmission.

Solution to Problem (1) The present invention has addressed the problems described above, and a transmission apparatus according an aspect of the present invention is a transmission apparatus that transmits a data signal to a reception apparatus and includes a control information reception unit that receives control information which is transmitted on a PDCCH or an EPDCCH from the reception apparatus; a control information transmission unit that transmits an SR that requests the control information; a transmission mode selection unit that selects a transmission mode for the data signal; and a transmit power control unit that configures a transmission power for the data signal. The transmission mode includes a first transmission mode in which the control information is received on the PDCCH or the EPDCCH in the control information reception unit and a data signal based on a transmission parameter included in the control information is transmitted, and a second transmission mode in which the control information is not received on any one of the PDCCH and the EPDCCH, and the data signal is transmitted without the reception apparatus being notified of a transmission timing of the data signal. In a case where transmission of the SR is possible and data transmission is possible with the first transmission mode and the second transmission mode, the transmission apparatus configures different transmission powers corresponding to the transmission modes.

(2) Furthermore, according to the aspect of the present invention, the transmission parameter includes at least one of frequency resource allocation used for transmission of the data signal, a modulation scheme, a coding rate, transmission information, and a cyclic shift of a demodulation reference signal.

(3) Furthermore, according to the aspect of the present invention, a transmission power for the second transmission mode is higher than a transmission power for the first transmission mode.

(4) Furthermore, according to the aspect of the present invention, a target reception power for the second transmission mode is higher than a target reception power for the first transmission mode.

(5) Furthermore, according to the aspect of the present invention, in the first transmission mode, the data signal is periodically transmitted, and in the second transmission mode, the data signal is aperiodically transmitted.

(6) Furthermore, according to the aspect of the present invention, a plurality of transmission powers are configurable in the second transmission mode, and the transmission power is configured in accordance with QoS of the data signal aperiodically transmitted.

(7) Furthermore, according to the aspect of the present invention, more frequency resources are used in the second transmission mode than in the first transmission mode.

(8) Furthermore, a plurality of transmission powers are configurable in the second transmission mode, and the transmission power is configured in accordance with QoS of the data signal aperiodically transmitted.

Advantageous Effects of Invention

According to the present invention, a reduction in an amount of control information in an M2M communication and a reduction in overhead that is necessary for data transmission can be realized. As a result, cell throughput is improved in the M2M communication.

BRIEF DESCRIPTION OF DRAWINGS

FIG. 7 is a diagram illustrating an example of a constitution of a signal detection unit 205 according to the present invention.

FIG. 8 is a diagram illustrating a sequence chart for uplink transmission not for M2M communication.

FIG. 9 is a diagram illustrating an example of a sequence chart for uplink transmission for the M2M communication according to the present invention.

DESCRIPTION OF EMBODIMENTS

Embodiments will be described below with reference to the drawings. In each of the following embodiments, description is given the assumption that a Machine-to-Machine Communication (M2M communication) (also referred to as a Machine Type Communication (MTC)) is performed, a transmission apparatus is defined as an M2M terminal (hereinafter referred to as a terminal apparatus), and a reception apparatus is a base station apparatus. However, examples are not limited thereto. Examples include application to uplink transmission in a cellular system, in which case a terminal apparatus that performs data transmission involving a human being is a transmission apparatus and the base station apparatus is a reception apparatus. Furthermore, application to downlink transmission in the cellular system is also possible, in which case the transmission apparatus and the reception apparatus in the uplink transmission become the reception apparatus and the transmission apparatus, respectively, in the data transmission.

Figure 1:
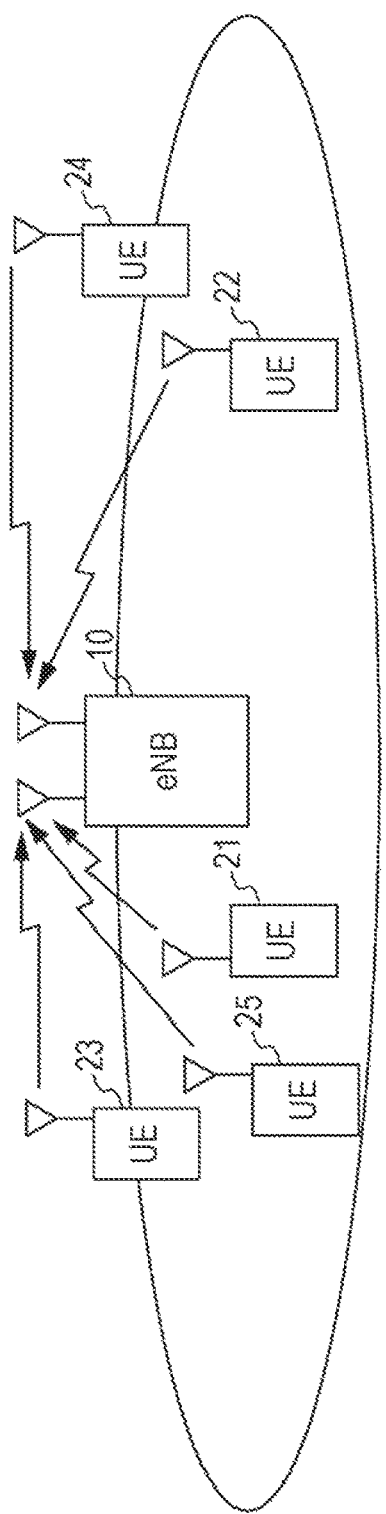
FIG. 1 is a diagram illustrating an example of a constitution of a system according to the present invention.

FIG. 1 illustrates an example of a constitution of a system according to the present invention. The system is constituted from a base station apparatus 10 and terminal apparatuses 21 to 25. Note that the number of terminal apparatuses (terminals, mobile terminals, mobile stations, or User Equipment (UE)) is not limited to this example and the number of antennas of each apparatus may be 1 or more. Furthermore, the base station apparatus 10 may perform communication in a so-called licensed band of which an approval of use is obtained from a country or a region where a wireless communication operator provides a service, or may perform communication in a so-called unlicensed band of which an approval of use does not need to be obtained from a country or a region. Furthermore, the base station apparatus 10 may be a macro base station apparatus that provides extensive coverage, or may be a pica base station apparatus (also referred to as Pico evolved Node B (eNB), a Small Cell, a Low Power Node, or a Remote Radio Head). Furthermore, a frequency band other than the licensed band in the present specification is not limited to an example of the unlicensed band, and may be a white band (a white space) or the like. Furthermore, the base station apparatus 10 may apply a Carrier Aggregation (CA) technology that uses a plurality of Components Carriers (CC) (also referred to as serving cells) in a band which is used for LTE communication, and, in the M2M communication and in non-M2M communication, may perform data transmission with different CCs or perform data transmission with the same CC. As an example of application of the CA, the non-M2M communication may be a primary cell (PCell) and the M2M communication may be a secondary cell (SCell). Furthermore, within the same CC, subcarriers used for the non-M2M communication and subcarriers used for the M2M communication may be different.

The terminal apparatuses 21 to 25 are capable of transmitting data for the M2M communication to the base station apparatus 10. The terminal apparatuses 21 to 25 performs the data transmission in a transmission mode in accordance with. Quality of Service (QoS) that is demanded for every data for the M2M communication or an overhead that is allowed for every data for the M2M communication. The terminal apparatuses 21 to 25 may be capable of Human-to-Machine Communication (H2M communication), Human-to-Human Communication (H2H communication) or the like, which involves a human being, without being limited to the M2M communication alone. In such a case, the base station apparatus transmits an UL Grant, which is control information that includes a transmission parameter which is used, for the data transmission, by dynamic scheduling or Semi-Persistent Scheduling (SPS) according to a type of data, on a Physical Downlink Control Channel (PDCCH) or an Enhanced PDCCH (EPDCCH). The terminal apparatuses 21 to 25 perform the data transmission based on a transmission parameter of the UL Grant.

First Embodiment

Figure 2:
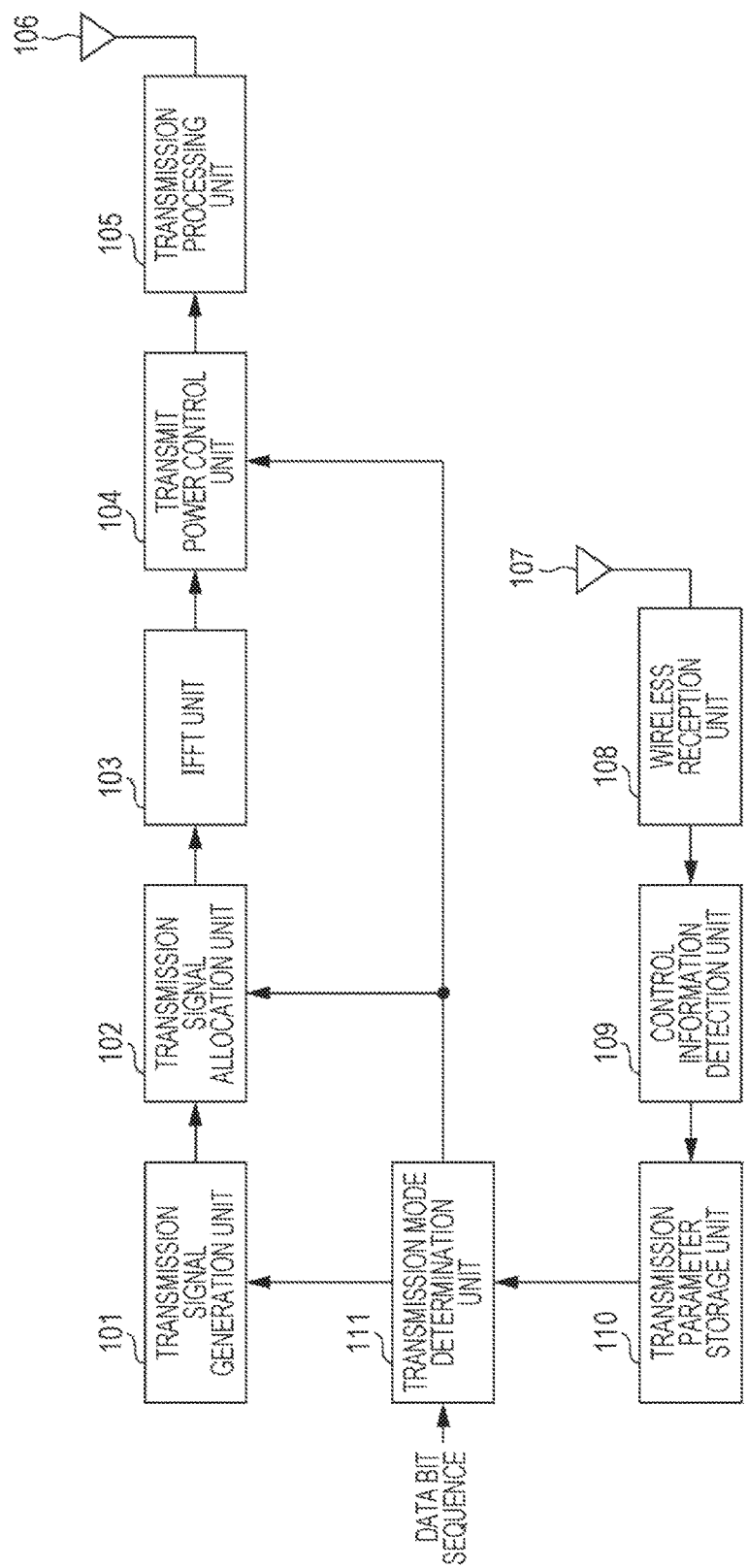
FIG. 2 is a diagram illustrating an example of a constitution of a terminal apparatus according to the present invention.

FIG. 2 illustrates an example of a constitution of the terminal apparatus according to the present invention. However, minimum necessary blocks for the present invention are illustrated. The terminal apparatus is a M2M terminal (for example, one of the terminal apparatuses 21 to 25) capable of performing the M2M communication. The terminal apparatus receives control information transmitted on the EPDCCH, the PDCCH, or a Physical Downlink Shared Channel (PDSCH) from the base station apparatus, with a receive antenna 107. A wireless reception unit 108 down-converts a reception signal into a signal of baseband frequency, performs analog-to-digital (A/D) conversion on the resulting signal, and input a signal that results from cancelling a Cyclic Prefix (CP) from a digital signal, into a control information detection unit 109. With blind decoding, the control information detection unit 109 detects a Downlink Control Information (DCI) format transmitted on the PDCCH or EPDCCH, which is destined for the terminal apparatus itself. Regarding the DCI format, a plurality of formats are stipulated according to their usage, and DCI format 0 for a single antenna for uplink, DCI format 4 for Multiple Input Multiple Output (MIMO), and the like are defined. Furthermore, in a case where a signal for Radio Resource Control (RRC) is received, the control information detection unit 109 also performs detection. The control information detection unit 109 input the detected control information into a transmission parameter storage unit 110. In a case where the UL Grant for dynamic scheduling, SPS, or the like, or an M2M Grant for the M2M communication is received, the transmission parameter storage unit 110 inputs the control information into a transmission mode determination unit 111. Furthermore, in a case where information relating to a transmit power control such as a target reception power for every transmission mode according to the RRC, information such as a transmission periodicity in the SPS, information relating to the M2M communication, or the like is received, the transmission parameter storage unit 110 retains such information as a transmission parameter until a timing for transmission. Types of transmission parameters that are retained in the transmission parameter storage unit 110, or use of these transmission parameters will be described below.

Figure 3:
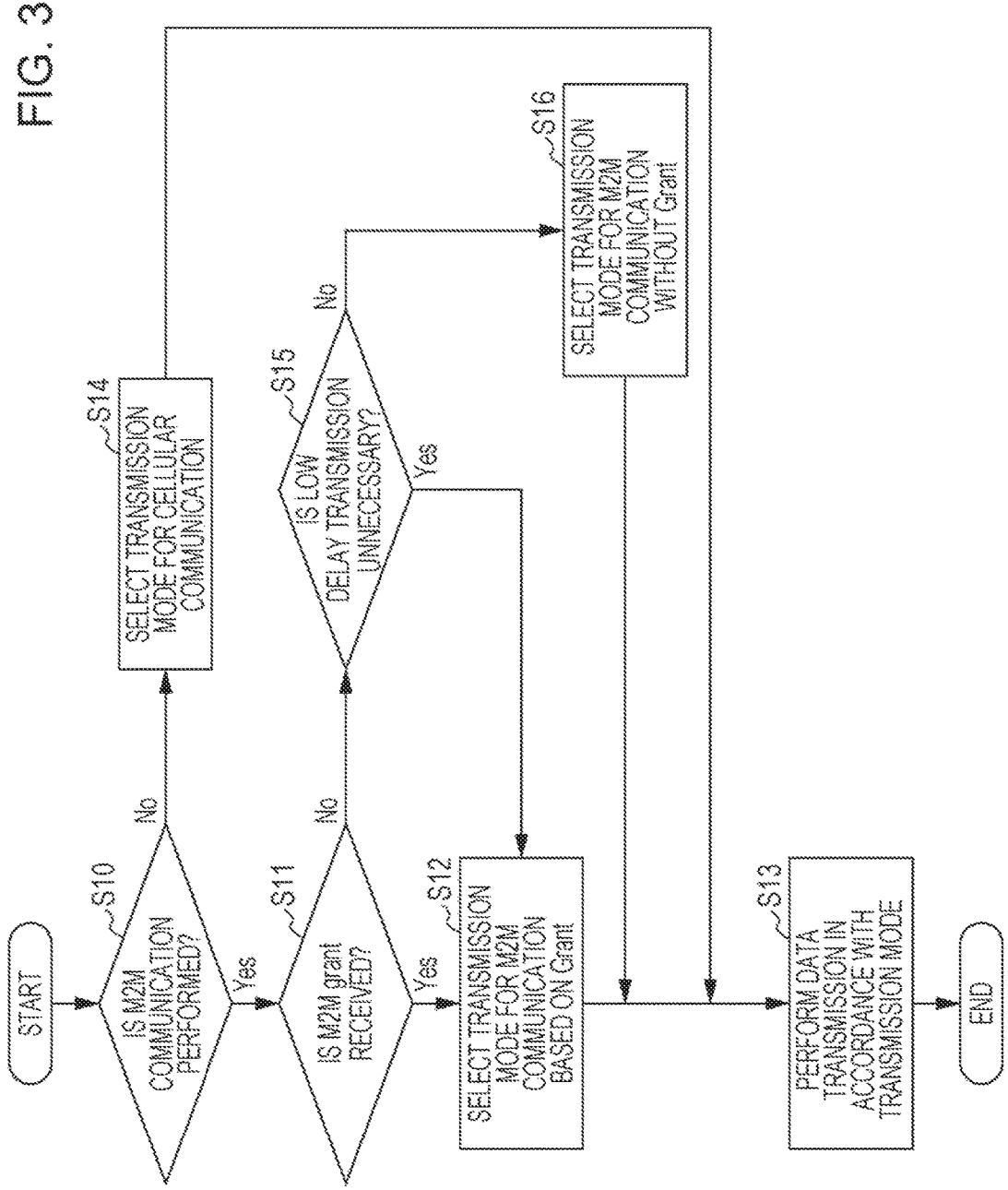
FIG. 3 is a diagram illustrating a flowchart for describing an example of a transmission mode selection according to the present embodiment.

The transmission mode determination unit 111, to which a bit sequence of transmission data is input and a type of transmission data, the QoS, or the allowed overhead is also input, determines the transmission mode. FIG. 3 illustrates a flowchart for describing an example of a transmission mode selection according to the present embodiment. First, the transmission mode determination unit 111 determines whether or not the transmission data is for the M2M communication (S10). In a case where the transmission data is not for the M2M communication, a transmission mode for cellular communication, which is used in LTE in the related art, is selected (S14). In a case where the transmission data is for the M2M communication, it is determined whether or not information indicating whether or not the M2M Grant that includes frequency resource allocation used for the M2M communication is received (S11) is input from the transmission parameter storage unit 110. In a case where the M2M Grant is received, a transmission mode for the M2M communication based on the M2M Grant is selected (S12). In a case where the M2M Grant is not received, it is determined whether or not the data for the M2M communication needs to be transmitted by low delay transmission (data for which overhead is not allowed) (S15). In a case where the low delay transmission is unnecessary, a process for grant request is performed in the same manner as in the cellular communication used for LTE in the related art, and the transmission mode for the M2M communication based on the M2M Grant is selected. In a case where the low delay transmission is necessary, the transmission mode for the M2M communication without the M2M Grant is selected (S16). The terminal apparatus performs data transmission in accordance with the transmission mode (S13). The transmission mode for the M2M communication without the M2M Grant means a transmission mode in which the terminal apparatus that transmits data satisfies both conditions, that is, transmission in a subframe designated with a Grant by the base station apparatus that is the reception apparatus, and data transmission, a transmission timing of which the base station apparatus is not notified by the terminal apparatus. However, conditions are not limited to these conditions, and the transmission mode for the M2M communication without the M2M Grant may be used in a case where at least one of these conditions is satisfied.

Figure 4:
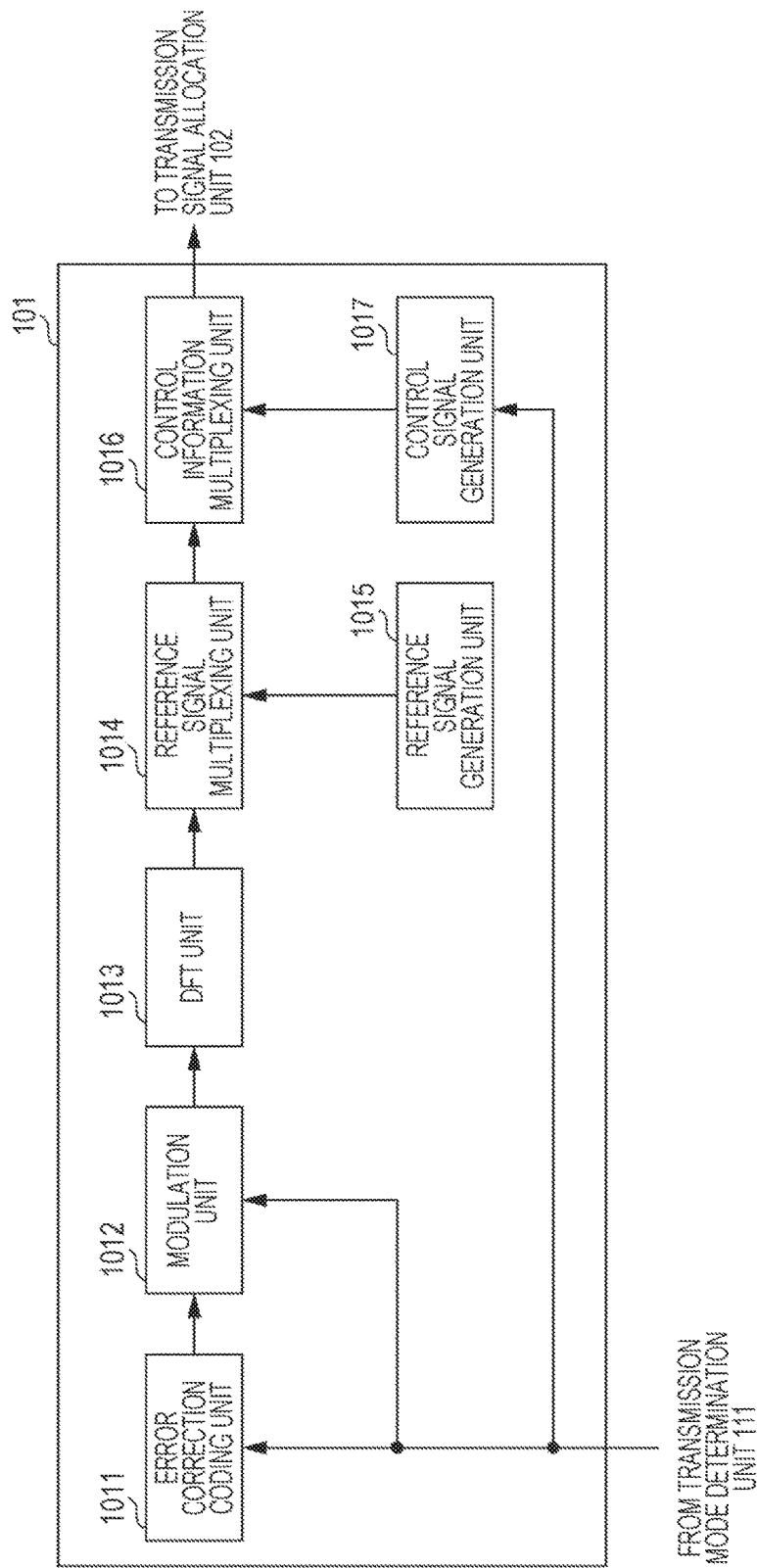
FIG. 4 is a diagram illustrating an example of a constitution of a transmission signal generation unit 101 according to the present invention.

The transmission mode with the bit sequence of the transmission data selected by the transmission mode determination unit 111, and information, that is, the transmission parameter in accordance with the transmission mode are input into the transmission signal generation unit 101. FIG. 4 illustrates an example of a constitution of the transmission signal generation unit 101 according to the present invention. In FIG. 4, an input data bit sequence is input into an error correction coding unit 1011. The error correction coding unit 1011 performs coding of an error correction code on the input data bit sequence. For example, a turbo code, a Low Density Parity Check (LDPC) code, a convolutional code, or the like is used as the error correction code. A type or coding rate of error correction coding performed in the error correction coding unit 1011 may be decided in advance in the transmission apparatus and reception apparatuses, be notified as the control information at every transmission and reception opportunity, and be changed using a parameter decided in advance according to the transmission mode and a parameter notified with the control information. In a case where the type or coding rate of the error correction coding is notified as the control information, such information is input by the transmission mode determination unit 111 into the error correction coding unit 1011.

A modulation unit 1012, into which information on a modulation scheme is input from the transmission mode determination unit 111, performs modulation on a coding bit sequence that is input by the error correction coding unit 1011, and thus generates a modulation symbol sequence. Modulation schemes include, for example, Quaternary Phase Shift Keying (QPSK), 16-ary Quadrature Amplitude Modulation (16 QAM), 64 QAM, and the like. The modulation unit 1012 outputs the generated modulation symbol sequence to a DFT unit 1013. The modulation scheme may be notified as the control information at every transmission and reception opportunity, be decided in advance in the transmission apparatus and the reception apparatus, or be changed using a parameter notified by the transmission mode with the control information and a parameter decided in advance between the transmission apparatus and the reception apparatus.

The DFT unit 1013 performs discrete Fourier transform on the input maculation symbol to convert the modulation symbol from a time domain signal to a frequency domain signal, and outputs the obtained frequency domain signal into a reference signal multiplexing unit 1014. The reference signal multiplexing unit 1014, into which a data signal sequence in a frequency domain is input from the DFT unit 1013 and into which a reference signal sequence is input from a reference signal generation unit 1015, multiplexes these signal sequences, and thus generates a frame of a transmission signal. However, the reference signal multiplexing unit 1014 may multiplex a data signal and a reference signal in a time domain.

On the other hand, a control signal generation unit 1017 generates uplink control information, that is, Channel State Information (CSI), Scheduling Request (SR), or Acknowledgement/Negative Acknowledgement (ACK/NACK), which is transmitted on a Physical Uplink Control Channel (PUCCH), and outputs the generated uplink control information to a control information multiplexing unit 1016. The control information multiplexing unit 1016 multiplexes the data signal and the control information.

The transmission signal generation unit 101 outputs a signal sequence that results from multiplexing the data signal and the control information, to a transmission signal allocation unit 102. The transmission signal allocation unit 102, into which resource allocation information, that is, information on one or more Resource Blocks (RB) that are used for the data transmission from the transmission mode determination unit 111, is input, allocates the transmission signal in the frequency domain to the RB that is designated. However, the resource allocation information may be based on a Resource Block Group (RBG) that is constituted from a plurality of RBs, instead of an RB basis, and be allocated to one or more RBGs. Furthermore, in the case of the data transmission based on the UL Grant, the allocation is performed on a per-subframe basis, one subframe is constituted from two slots, and one slot is constituted from seven OFDM symbols. Furthermore, one RB is constituted from 12 subcarriers. Consequently, one RB means a resource constituted from 12 subcarriers or 14 OFDM symbols. Furthermore, the resource allocation information may be notified as the control information at every transmission and reception opportunity, be decided in advance in the transmission apparatus and the reception apparatus, or be changed using the parameter notified by the transmission mode with the control information and the parameter decided in advance between the transmission apparatus and the reception apparatus. Note that the parameter described above is specified in LTE, but not limited thereto and any frame structure may be used.

An IFFT unit 103, into which the frame of the transmission signal in the frequency domain is input, performs Inverse Fast Fourier Transform on an OFDM-symbol basis, and thus converts a frequency-domain signal sequence into a time-domain signal sequence. The time-domain signal sequence is input into a transmit power control unit 104. A transmit power control unit 104 performs the transmit power control in accordance with the transmission mode, which will be described below, on the time-domain signal sequence, and outputs the resulting time-domain signal sequence to a transmission processing unit 105. The transmission processing unit 105 inserts the CP into the signal sequence, converts the resulting signal sequence into an analog signal by performing digital-to-analog (D/A) conversion, and up-converts the post-conversion signal into a signal of radio frequency used for transmission. The transmission processing unit 105 amplifies the signal that results from the up-converting, with a Power Amplifier (PA), and transmits the post-amplification signal through a transmit antenna 106. The example in which the terminal apparatus transmits the Discrete Fourier Transform Spread Orthogonal Frequency Division Multiplexing (DFTS-OFDM) (also referred to as SC-FDMA) signal is described above, but the terminal apparatus may transmit the OFDM signal without performing the processing by the DFT unit 1013.

Figure 5:
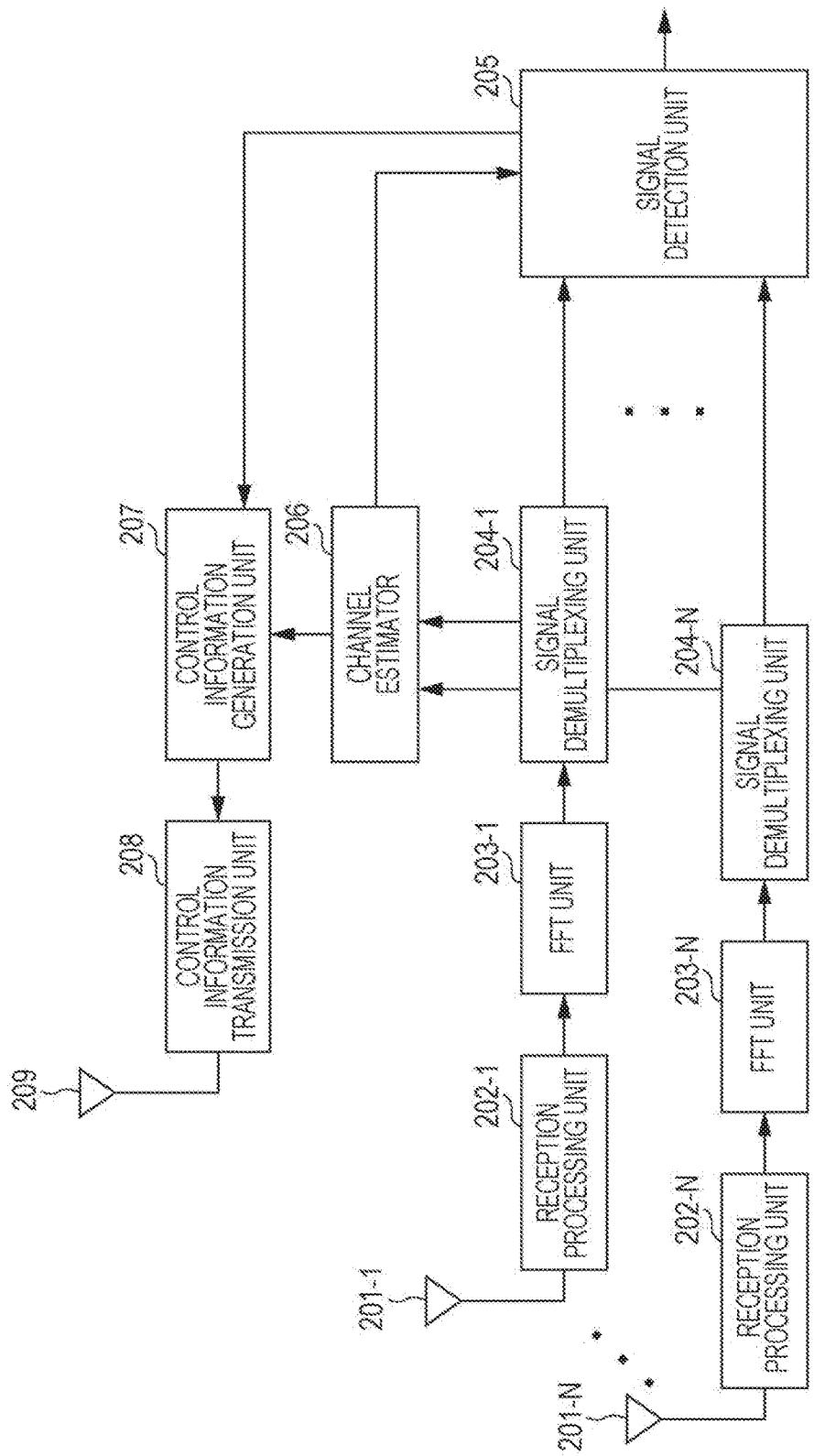
FIG. 5 is a diagram illustrating an example of a constitution of a base station apparatus according to the present invention.

FIG. 5 illustrates an example of a constitution of a base station apparatus according to the present invention. In FIG. 5, the base station apparatus receives data transmitted by a terminal apparatus, with N receive antennas 201-1 to 201-N, and inputs the received data into reception processing units 202-1 to 202-N, respectively. The reception processing units 202-1 to 202-N down-convert the reception signal into a signal of baseband frequency, performs A/D conversion, and cancels the CP from the resulting digital signal. The reception processing units 202-1 to 202-N output the signal that results from cancelling the CP, to FFT units 203-1 to 203-N, respectively. The FFT units 203-1 to 203-N convert the input reception signal sequence from a time domain signal sequence into a frequency-domain signal sequence by performing Fast Fourier Transform, and outputs the resulting frequency-domain signal sequence to signal demultiplexing units 204-1 to 204-N.

Figure 6:
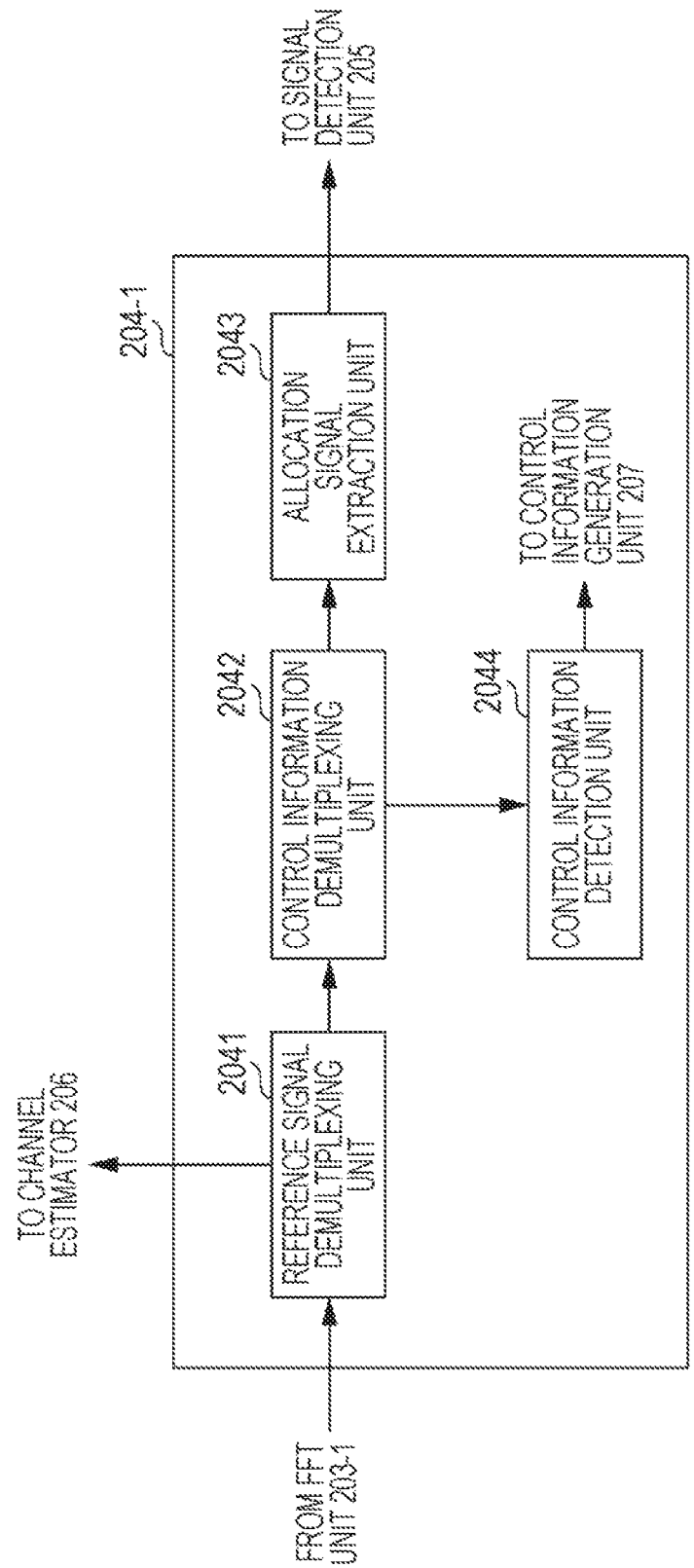
FIG. 6 is a diagram illustrating an example of a constitution of a signal demultiplexing unit 204-1 according to the present invention.

The signal demultiplexing units 204-1 to 204-N all have the same constitution, and FIG. 6 illustrates an example of the signal demultiplexing unit 204-1 according to the present invention. In FIG. 6, the frequency-domain signal sequence is input from the FFT unit 203-1 into a reference signal demultiplexing unit 2041 of the signal demultiplexing unit 204-1. The reference signal demultiplexing unit 2041 demultiplexes the input signal into a reference signal and the other signals, and outputs the reference signal and the other signals to a channel estimator 206 and a control information demultiplexing unit 2042, respectively. The control information demultiplexing unit 2042 demultiplexes the input signal, into a control signal and a data signal, and outputs the control signal and the data signal to a control information detection unit 2044 and an allocation signal extraction unit 2043, respectively. The control information detection unit 2044 detects the signal transmitted on the PUCCH, and outputs the SR for use in uplink scheduling, the CSI for use in downlink scheduling, and the ACK/NACK for use in retransmission control of the downlink transmission, to a control information generation unit 207. On the other hand, the allocation signal extraction unit 2043 extracts the transmission signal of every terminal apparatus based on the resource allocation information of which the terminal apparatus is notified with the control information.

The channel estimator 206, into which a De-Modulation Reference Signal (DMRS) transmitted in a state of being multiplexed with the data signal is input, outputs a frequency response estimated for demodulation, to a signal detection unit 205. Furthermore, in a case where a Sounding Reference Signal (SRS) is input, the channel estimator 206 estimates a frequency response used for the next scheduling. The control information generation unit 207 performs the uplink scheduling and Adaptive Modulation and Coding (also referred to as link adaptation) based on the frequency response estimated with the DMRS or the SRS, generates a transmission parameter used by the terminal apparatus for the uplink transmission, and converts the generated transmission parameter into the DCI format. Furthermore, in a case where information on the presence/absence of an error in the received data signal is input from the signal detection unit 205, the control information generation unit 207 generates control information that notifies the ACK/NACK in the uplink transmission. The ACK/NACK in the uplink transmission is transmitted on at least one of a Physical HARQ Indicator Channel (PHICH), PDCCH, or the EPDCCH. A control information transmission unit 208, into which the converted control information is input from the control information generation unit 207, allocates the input control information, to the PDCCH or the EPDCCH for the transmission to each terminal apparatus.

FIG. 7 illustrates an example of a constitution of the signal detection unit 205 according to the present invention. The signal for every terminal apparatus, which is extracted from each of the signal demultiplexing units 204-1 to 204-N, is input into a cancellation processing unit 2051 of the signal detection unit 205. The cancellation processing unit 2051, into which a soft replica is input from a soft replica generation unit 2057, performs cancellation processing on each reception signal. An equalization unit 2052 generates equalization weight based on an MMSE norm from the frequency response input by the channel estimator 206, and multiplies the signal subjected to the cancellation, by the equalization weight. The equalization unit 2052 outputs the post-equalization signal of every terminal apparatus to IDFT units 2053-1 to 2053-U. The IDFT units 2053-1 to 2053-U convert the post-equalization reception signal into a time-domain signal. Demodulation units 2054-1 to 2054-U, into which information on the modulation scheme, which is not illustrated but is notified, or is decided in advance, is input, performs demodulation processing on a time-domain reception signal sequence, and obtains a Log Likelihood Ratio (LLR) of a bit sequence, more precisely, an LLR sequence.

Decoding units 2055-1 to 2055-U, into which information, that is, a coding rate that is not illustrated but is notified in advance or is decided in advance, is input, performs decoding processing on the LLR sequence. In order to perform cancellation processing, that is, a Successive Interference Canceller (SIC) or turbo equalization, the decoding units 2055-1 to 2055-U output an external LLR or a post-LLR of a decoder output to symbol replica generation units 2056-1 to 2056-U, respectively. A difference between the external LLR and the post-LLR is whether or not the pre-LLR input into each of the decoding units 2055-1 to 2055-U is subtracted from the post-decoding LLR. The symbol replica generation units 2056-1 to 2056-U generate a symbol replica according to the modulation scheme, which the terminal apparatus uses for the data transmission, from the input LLR sequence, and output the generated symbol replica to the soft replica generation unit 2057. The soft replica generation unit 2057 converts the input symbol replica, into a frequency-domain signal using DFT, allocates the signal to a resource used by each terminal apparatus, and multiplies the frequency response, thereby generating a replica. In a case where the number of times that the SIC processing or the turbo equalization is iterated reaches the predetermined number of times, the decoding units 2055-1 to 2055-U make a hard determination on the post-decoding LLR sequence, determines the presence/absence of an error bit from the Cyclic Redundancy Check (CRC) and outputs information on the presence/absence of the error bit to the control information generation unit 207.

In the case of the uplink transmission that is not for the M2M communication, if uplink data occurs, the terminal apparatus performs the data transmission based on the Modulation and Coding Scheme (MCS), the resource allocation information, or the like, which is notified with the UL Grant. In FIG. 8, an example of a sequence chart for the uplink transmission that is not for the M2M communication illustrated. First, with the RRC, the base station apparatus notifies in advance the terminal apparatus of information relating to a resource for SR transmission or the transmit power control (S100). In a case where the uplink data occurs and a UL Grant is received, the terminal apparatus transmits the SR in order to request the UL Grant (S101). The base station apparatus receives the SR and then transmits the UL Grant to the terminal apparatus on the PDCCH or the EPDCCH (S102). In the case of Frequency Division Duplex (FDD) (also referred to as a frame structure type 1), the terminal apparatus performs the data transmission based on the transmission parameter which is included in the UL Grant, in a subframe that appears 4 msec after a subframe in which the UL Grant is detected with the blind decoding on the PDCCH or the EPDCCH (S103). However, in the case of Time Division Duplex (TDD) (also referred to as a frame structure type 2), delay is not always 4 msec, but for simple description, FDD is assumed. The base station apparatus detects data transmitted by the terminal apparatus, and transmits ACK/NACK indicating whether or not there is an error in the data detected in the subframe that appears 4 msec after the subframe in which the data signal is received (S104). In S101, in a case where the terminal apparatus is not notified of the resource for the SR transmission with the RRC, the terminal apparatus requests the UL Grant using a Random Access Channel (RACH). Furthermore, S102, in the case of dynamic scheduling, the data transmission in only one subframe is possible, but in the case of the SPS, periodic data transmission is approved and information such as a periodicity of the SPS is notified with the RRC in S100. The transmission parameter such as the resource for the SR transmission, the periodicity of the SPS, or the like, which is notified with the RRC by the base station apparatus, is stored in the transmission parameter storage unit 110 of the terminal apparatus.

In FIG. 9, an example of the sequence chart for the uplink transmission that is for the M2M communication according to the present invention is illustrated. For the M2M communication according to the present invention, there is a transmission mode in which data transmission is performed based on the M2M Grant and data transmission is performed without receiving the M2M Grant. In the case of the data transmission based on the M2M Grant, the data transmission performed in the same manner as in FIG. 8. On the other hand, in a case where the data transmission is performed without receiving the M2M Grant, the data transmission is performed in an example in FIG. 9. First, in the case where the data transmission is performed without receiving the M2M Grant, the base station apparatus notifies the terminal apparatus of an available resource, the information relating to the transmit power control, the MCS, and the like, using the RRC (S200). However, not limited to the RRC, but other control information may be used. Furthermore, one resource may be available, or the terminal apparatus, which is notified of a plurality of candidate resources, may select a resource used for the data transmission, from the candidate resources. The terminal apparatus receives a transmission parameter in the case where the data transmission is performed without receiving the M2M Grant, and retains the received transmission parameter in the transmission parameter storage unit 110. In a case where the transmission data occurs and the data needs to be transmitted with a short delay, the terminal apparatus performs the data transmission with the transmission parameter retained in the transmission parameter storage unit 110 (S201). In this case, the terminal apparatus may not notify the base station apparatus of a data transmission timing. The base station apparatus performs data reception processing without the UL Grant or the M2M Grant, and data transmitted without the notification of the data transmission timing to the terminal apparatus. For example, with a resource designated for the data transmission without M2M Grant in S100, the base station apparatus may perform the reception processing with data being transmitted in every subframe, and may determine the presence/absence of the data transmission, depending on whether or not the data can be correctly detected with error correction decoding and CRC. Note that a received power in the resource notified with the RRC may be monitored, and, only in a case where the received power exceeds a predetermined power, the reception processing may be performed. Furthermore, the presence/absence of the data transmission may be determined depending on whether or not the DMRSs that are orthogonalized with Cyclic Shift (CS) or Orthogonal Cover Code (OCC) by a plurality of terminal apparatuses and are transmitted can be detected. The base station apparatus detects the data transmitted by the terminal apparatus, and transmits the ACK/NACK indicating whether or not there is an error in the data detected in the subframe that appears 4 msec after the subframe in which the data signal is received (S202).

In the example in FIG. 9, because a UL Grant request with the SR after the occurrence of the data illustrated in FIG. 8, an overhead taking for the base station apparatus to transmit the UL Grant, and an overhead of 4 msec after the UL Grant is received do not occur any more, low delay data transmission can be realized. However, whereas the low delay data transmission can be realized, in a case where a resource designated for the data transmission without M2M Grant is not allocated, with the UL Grant or the M2M Grant, to any terminal apparatus, time not in use is present, and spectral efficiency is decreased. Furthermore, when the resource designated for the data transmission without the M2M Grant is allocated also with the UL Grant or the M2M Grant, contention between the data transmission without the M2M Grant and the data transmission with the UL Grant or the M2M Grant occurs. The base station apparatus detects the data that contends, with SIC or the turbo equalization. However, interference component due to the contention is not always removed depending on the number of signals that contend and an instantaneous channel, and there is a likelihood that predetermined received quality will not be satisfied.

Accordingly, in the present embodiment, in the transmit power control unit 104 of the terminal apparatus, different transmit power controls are performed in the transmission mode for the M2M communication without the M2M Grant and the transmission mode for the M2M communication based on the UL Grant or the M2M Grant, and thus the received quality is improved without increasing the overhead. First, a transmission power in the data transmission from the terminal apparatus based on the UL Grant is decided by $P_{PUSCH,c}(i) = \min\{P_{CMAX,c}(i), 10\log_{10}(M_{PUSCH,c}(i)) + P_{O\_PUSCH,c}(j) + \alpha_c(j) \cdot PL_c + \Delta_{TF,c}(i) + f_c(i)\}$, where min is selected to be a small value in parentheses, $P_{CMAX,c}(i)$ is an allowed maximum transmission power of the terminal apparatus in an i-th subframe in a serving cell c, $M_{PUSCH,c}(i)$ is the number of RBs that are allocated in the i-th subframe in the sewing cell c, $P_{O\_PUSCH,c}(j)$ is a nominal target reception power per RB in scheduling j in the serving cell c, j is a value that depends on a type of scheduling or a transmission signal, j=0 is SPS, j=1 is dynamic scheduling, j=2 is RACH, $\alpha_c(j)$ is a parameter of a fractional transmit power control in the serving cell c, $PL_c$ is a path loss in the serving cell c, $\Delta_{TF,c}(i)$ is a parameter that results from a modulation order of the i-th subframe in the serving cell c, and $f_c(j)$ is a parameter notified by the base station apparatus to toe terminal apparatus in order to perform closed loop control in the serving cell c.

$P_{O\_PUSCH,c}(j)$ used for calculation of the transmission power is decided by the sum of $P_{O\_NOMINAL\_PUSCH,c}(j)$ and $P_{O\_UE\_PUSCH,c}(j)$. In a case where j=0 or 1, a value of $P_{O\_NOMINAL\_PUSCH,c}(j)$ is notified with the RRC, and, in a case where j=2, $P_{O\_NOMINAL\_PUSCH,c}(j)$ is decided by the sum of $P_{O\_PRE}$ and $\Delta_{PREAMBLE\_Msg3}$ notified with a higher layer. In a case where j=0 or 1, a value of $P_{O\_UE\_PUSCH,c}(j)$ is notified with the RRC, and, in a case where j=2, $P_{O\_UE\_PUSCH,c}(j)$ is 0.

Figure 10:
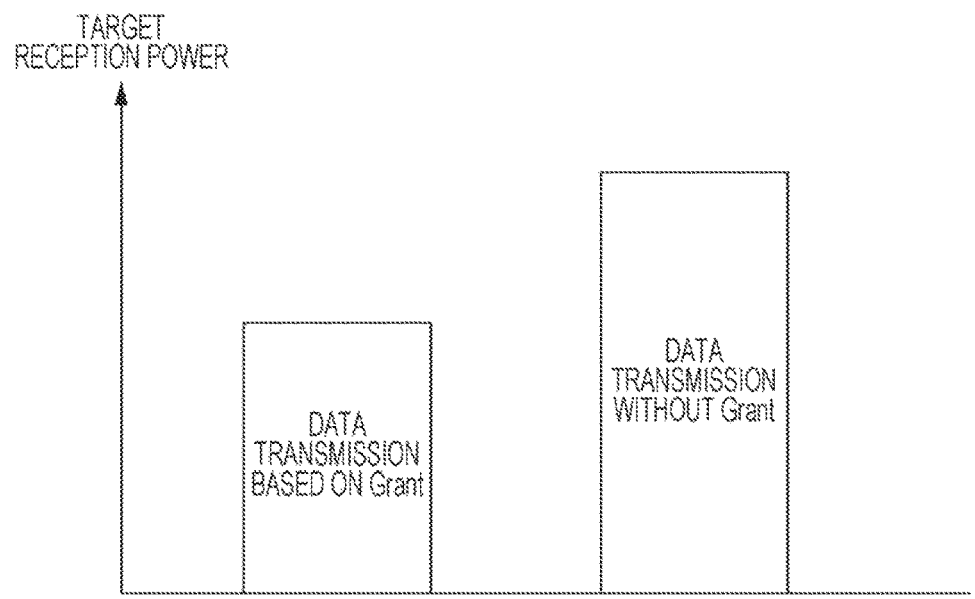
FIG. 10 is a diagram illustrating an example of a target reception power according to the present invention.

Next, an example in which a transmission power $P_{PUSCH,c}(j)$ is calculated by the terminal apparatus according to the present embodiment in the M2M communication without the M2M Grant is the same as that in which $P_{PUSCH,c}(i)$ is calculated, but is different from that in which $P_{O\_PUSCH,c}(j)$ is calculated. In addition to j=0 to 2 defined in the LTE system in the related art, j=3 is defined for the transmission mode for the M2M communication without the M2M Grant. More precisely, $P_{PUSCH,c}(3)$ is the sum of $P_{O\_NOMINAL\_PUSCH,c}(3)$ and $P_{O\_UE\_PUSCH,c}(3)$, and $P_{O\_NOMINAL\_PUSCH,c}(3)$ and $P_{O\_UE\_PUSCH,c}(3)$ are decided from a common value in the serving cell c and a UE-specific value, respectively. The target reception power $P_{PUSCH,c}(i)$ according to the present embodiment may be as illustrated in FIG. 10, depending on whether or not the target reception power $P_{PUSCH,c}(i)$ is for the data transmission based on the Grant. More precisely, the target reception power for the data transmission without the Grant is configured to be higher than the data transmission based on the Grant. An example in which the target reception power $P_{PUSCH,c}(3)$ for the data transmission without the Grant is increased is realized by controlling the UE-specific value as in $P_{O\_UE\_PUSCH,c}(3) > P_{O\_UE\_PUSCH,c}(0)$ and $P_{O\_NOMINAL\_PUSCH,c}(3) = P_{O\_NOMINAL\_PUSCH,c}(0)$, in a case where the target reception power $P_{PUSCH,c}(3)$ is increased more than in the SPS. However, examples are not limited thereto. Both of the common value in the serving cell c and the UE-specific value may be increased as in $P_{O\_UE\_PUSCH,c}(3) > P_{O\_UE\_PUSCH,c}(0)$ and $P_{O\_NOMINAL\_PUSCH,c}(3) > P_{O\_NOMINAL\_PUSCH,c}(0)$, or only the common value in the serving cell c may be increased as in $P_{O\_UE\_PUSCH,c}(3) = P_{O\_UE\_PUSCH,c}(0)$ and $P_{O\_NOMINAL\_PUSCH,c}(3) > P_{O\_NOMINAL\_PUSCH,c}(0)$. Furthermore, the example in which the target reception power for the data transmission without the Grant is increased to be higher than the target reception power for the SPS is described, but these examples may be used in a case where the target reception power for the data transmission is increased to be higher than a target reception power for the dynamic scheduling. As a result, transmission power in the case of the data transmission without the Grant, which is decided with the transmit power control, is higher than that in the case of the data transmission based on the Grant.

Furthermore, as another example of the calculation of the transmission power $P_{PUSCH,c}(i)$ in the M2M communication, j=3 is defined for the M2M communication, and the target reception power is calculated with $P_{PUSCH,c}(3) = P_{O\_NOMINAL\_PUSCH,c}(3) + P_{O\_UE\_PUSCH,c}(3) + P_{O\_GRANT,c}$. In the serving cell c, $P_{O\_GRANT,c}$ may be 0 when the UL Grant or the M2M Grant is received, and may take a positive value in the case of the data transmission without the Grant. $P_{O\_GRANT,c}$ is notified with the RRC or control information of the higher layer, and for example, is notified at a timing in S200 in FIG. 9.

As another example, and in a case where a priority level is decided by QoS of data or the allowed overhead, the target reception power is calculated with $P_{PUSCH,c}(3) = P_{O\_NOMINAL\_PUSCH,c}(3) + P_{O\_UE\_PUSCH,c}(3) + P_{O\_GRANT,c} + P_{O\_PRI,c}(I_{PRI})$. $P_{O\_PRI,c}(I_{PRI})$ is an amount of increase in the target reception power in accordance with a priority level of data transmitted, and is configured in such a manner that the higher the priority level, the higher the target reception power. For example, as a method of configuring $P_{O\_PRI,c}(I_{PRI})$, there may be five priority levels such as $P_{O\_PRI,c}(I_{PRI}) = \{0, 0.5, 1.0, 1.5, 2.0\}$. $P_{O\_PRI,c}(I_{PRI})$ may be added only when $P_{PUSCH,c}(3)$ is calculated, and in a case where j=0 to 2, may be present as a term that always satisfies $P_{O\_PRI,c}(I_{PRI}) = 0$. $P_{O\_PRI,c}(I_{PRI})$ is notified with the RRC or the control information of the higher layer, and for example, is notified at a timing in S200 in FIG. 9.

The SPS and the dynamic scheduling in a case where j=0 or 1 is decided by the blind decoding in the DCI format transmitted on the PDCCH. Specifically, the terminal apparatus performs the blind decoding on a candidate Common Search Space (CSS) or UE-specific Search Space (USS) to which the DCI format may be arranged, and determines whether or not the detection can be performed correctly with the CRC. At this time, the CRC is obtained by performing an exclusive OR operation using a Cell-Radio Network Temporary Identifier (C-RNTI) or SPSC-RNTI that is the UE-specific ID, and thus it is possible to avoid detection of the DCI format to another terminal apparatus. In a case where the DCI format is detected with the SPS C-RNTI, j=0, and in case where the DCI formation is detected with the C-RNTI, j=1. In the case of the data transmission without the Grant, because this means that it is detected by the blind decoding and is not based on the DCI format, according to a type of data transmitted, it is recognized that the terminal apparatus uses j=3. Furthermore, in the data transmission based on the Grant of the M2M communication, in a case where the DCI format is detected with an M2M C-RNTI, setting of j=3 may be provided. Furthermore, in a case where a transmission mode for the data transmission in the M2M communication is present, at the time of the transmission mode for the M2M communication, j=3 may be used. Note that, regarding determination of the transmission mode, the transmission mode for the M2M communication without the M2M Grant and the transmission mode for the M2M communication based on the UL Grant or the M2M Grant may be decided depending whether or not a Discontinuous Reception (DRX) period is given. The transmission mode in the DRX period may be the transmission mode for the M2M communication without M2M Grant, and, the transmission mode not in the DRX period may be the transmission mode for the M2M communication based on the UL Grant or the M2M Grant. The DRX period is a period during which the blind decoding on the PDCCH or the EPDCCH is not performed, more precisely, a period during which the Downlink Control Information is not received. The period during which the Downlink Control Information is not allowed to receive may be handled as the DRX period described above, and accordingly, the transmission mode may be decided. Furthermore, an example is described in which the transmission mode for the M2M communication without the M2M Grant and the transmission mode for the M2M communication based on the UL Grant or the M2M Grant are determined by the terminal apparatus, but examples are not limited thereto. The base station apparatus may designate the transmission mode of the terminal apparatus, with the control information.

In the present embodiment, an example of FDD is described, but is also applicable to TDD. Furthermore, the example in which the target reception power for the data transmission without the Grant is reduced to be lower than the target reception power for the data transmission based on the Grant, but may be decreased to be lower than a target reception power for the RACH.

As described above, in the present embodiment, in the data transmission without the Grant and the data transmission based on the Grant, different transmit power controls are applied and the transmission power for the data transmission without the Grant is increased. As a result, in a case where there is a power difference in the the turbo equalization or SIC cancellation processing in the reception processing, because signal detection accuracy is increased, in the present embodiment, even in a case where there is contention between the data transmission without the Grant and the data transmission based on the Grant, degradation in the received quality can be reduced. Consequently, in the present embodiment, a predetermined received quality is satisfied, and further the low delay transmission that has low overhead during the occurrence of data to the data transmission and the reduction in the amount of control information can also be realized. Thus, the frequency efficiency or throughput of the entire system is improved.

Second Embodiment

In the second embodiment of the present invention, an example is described in which the transmission modes for the data transmission based on the Grant and the data transmission without the Grant are configured and the transmit power control is changed depending on the transmission mode, and thus the degradation in the received quality is reduced even in the case where there is the contention between the data transmission without the Grant and the data transmission based on the Grant.

In the present embodiment, examples of constitutions of the terminal apparatus and the base station apparatus are the same as those in the first embodiment, and are illustrated in FIGS. 2 and 5, respectively. Furthermore, a sequence chart in the data transmission based on the Grant is the same as that in the first embodiment, and is illustrated in FIG. 8. Furthermore, a sequence chart in the data transmission without the Grant is the same as that in the first embodiment, and is illustrated in FIG. 9. Accordingly, in the present embodiment, only different processing is described, and a description of similar processing is omitted.

First, the transmit power control unit 104 in the terminal apparatus, in the transmission mode for the data transmission based on the Grant, a formula for calculation is substantially the same as that for the calculation of $P_{PUSCH,c}(j)$ according to the first embodiment, and in the transmission mode for the data transmission without the Grant, a different formula for calculation for the transmit power control is used. Specifically, the transmission power is decided by $P_{PUSCH,c}(i)=\min\{P_{CMAX,c}(i), 10 \log_{10} (M_{PUSCH,c}(i))+\beta P_{O\_PUSCH,c}(j)+\alpha_c(j)\cdot PL_c+\Delta_{TF,c}(i)+f_c(i)\}$. $\beta$ is added. In the transmission mode for the data transmission based on the Grant, $\beta=1$ and in the transmission mode for the data transmission without the Grant, $\beta>1$. As a result, the target reception power can be increased in the data transmission without the Grant. Furthermore, in the data transmission without the Grant, the priority level may be configured for every data according to the QoS, and $\beta$ may take a plurality of values. For example, there are five priority levels, such as $\beta=\{1.1, 1.2, 1.3, 1.4, 1.5\}$. A value of $\beta$ used by the terminal apparatus may be decided by the terminal apparatus, be notified by the base station apparatus with the control information, or be decided with a method decided in advance.

However, examples are not limited thereto, and in the transmit power control unit 104 of the terminal apparatus, the transmit power control may be that $P_{PUSCH,c}(i)=\min\{P_{CMAX,c}(i), 10 \log_{10} (M_{PUSCH,c}(i))+P_{O\_PUSCH,c}(j)+P_{O\_PRI,c}(I_{PRI})+\alpha_c(j)\cdot PL_c+\Delta_{TF,c}(i)+f_c(i)\}$. Instead of $\beta$, $P_{O\_PRI,c}(I_{PRI})$ is added. In the transmission mode for the data transmission based on the Grant, $P_{O\_PRI,c}(I_{PRI})=0$, in the transmission mode for the data transmission without the Grant, $P_{O\_PRI,c}(I_{PRI})>0$. $I_{PRI}$ is an index of the priority level. As a result, the target reception power can be increased in the data transmission without the Grant. Furthermore, in the data transmission without the Grant, a priority level IPRI may be configured for every data according to the QoS, and $P_{O\_PRI,c}(I_{PRI})$ may take a plurality of values. For example, if there are five priority levels, $P_{O\_PRI,c}(I_{PRI})=\{0.5, 1.0, 1.5, 2.0, 2.5\}$ or the like. The priority level IPRI of $P_{O\_PRI,c}(I_{PRI})$ used by the terminal apparatus may be decided by the terminal apparatus, be notified by the base station apparatus with the control information, and be decided with a method decided in advance.

Furthermore, as another example, the transmit power control unit 104 of the terminal apparatus, $P_{CMAX,c}(i)$ in the formula for the calculation of $P_{PUSCH,c}(i)$ may be changed depending on the transmission mode. The terminal apparatus configures $P_{CMAX,c}(i)$ to be in a range of $P_{CMAX\_L,c} \leq P_{CMAX,c}(i) \leq P_{CMAX\_H,c}$. $P_{CMAX\_L,c}$ is decided from $P_{PowerClass}$ that is a maximum transmission power of the terminal apparatus, $P_{EMAX,c}$ that is a maximum value of the transmission power that the terminal apparatus is allowed to use, which is notified with the higher layer, Maximum Power Reduction (MPR), and the like, and $P_{CMAX\_H,c}$ is decided from $P_{PowerClass}$ and $P_{EMAX,c}$. In this case, with a notification in such a manner that $P_{EMAX,c}$ can be increased to be higher in the data transmission without the Grant more than in the data transmission based on the Grant, the terminal apparatus may be able to increase $P_{CMAX,c}(i)$ with the transmit power control for the data transmission without the Grant. Furthermore, in a case where the terminal apparatus performs a configuration that provides $P_{CMAX,c}(i) < P_{CMAX\_H,c}$, with the transmit power control for the data transmission based on the Grant, the terminal apparatus may set $P_{CMAX,c}(i)$ to a great value, with the data transmission without the Grant, and for example, may provide a setting of $P_{CMAX,c}(i) = P_{CMAX-H,c}$.

In the present embodiment, the example in which the target reception power for the data transmission without the Grant is reduced to be lower than the target reception power for the data transmission based on the Grant, but may be decreased to be lower than the target reception power for the RACH.

As described above, in the present embodiment, in the data transmission without the Grant and the data transmission based on the Grant, different transmit power controls are applied and the transmission power for the data transmission without the Grant is increased. As a result, in the case where there is a power difference in the turbo equalization or the SIC cancellation processing in the reception processing, because the signal detection accuracy is increased, in the present embodiment, even in the case where the data transmission without the Grant, and the data transmission based on the Grant contend, the degradation in the received quality ran be reduced. Consequently, in the present embodiment, predetermined received quality is satisfied, a the low delay transmission that has low overhead during the occurrence of data to the data transmission and the reduction in the amount of control information can also be realized. Thus, the frequency efficiency or the throughput of the entire system is improved.

Third Embodiment

In a third embodiment of the present invention, an example is described in which different transmit power controls are performed with a periodic data transmission and an aperiodic data transmission in the M2M communication.

In the present embodiment, examples of constitutions of the terminal apparatus and the base station apparatus are the same as those in the first embodiment, and are illustrated in FIGS. 2 and 5, respectively. Accordingly, in the present embodiment, only different processing is described, and a description of similar processing is omitted. The aperiodic data transmission in the M2M communication is the data transmission without the Grant as in the embodiments described above. A sequence chart in the data transmission in such a case is similar to that in the first embodiment, which is illustrated in FIG. 9. Furthermore, a sequence chart in the periodic data transmission in the M2M communication illustrated in FIG. 11.

Figure 11:
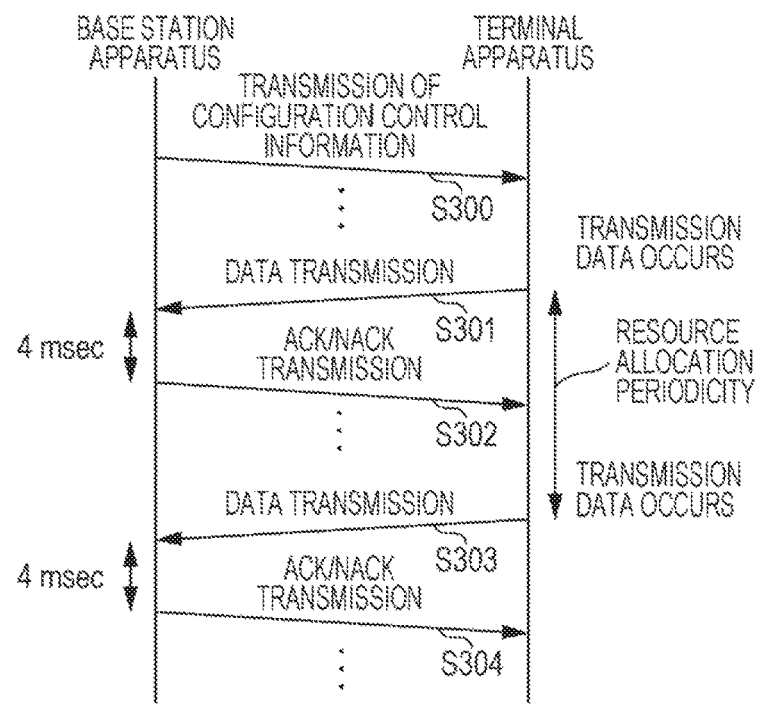
FIG. 11 is a diagram illustrating an example of a sequence chart for periodic data transmission in the M2M communication according to the present invention.

In FIG. 11, first, the base station apparatus notifies the terminal apparatus of an available resource in a case where the periodic data transmission is performed in the M2M, a resource allocation periodicity, an offset of a subframe number allocated, information relating to the transmit power control, the MCS, and the like, with the RRC (S300). The offset of the subframe number means that an offset X is configured for a reference subframe (for example, subframe #0) and a subframe that is the reference subframe+X is periodically allocated. Furthermore, in the present embodiment, the example is described in which these configurations are notified with the RRC, but the control information of the higher layer, such as a System Information Block (SIB) or the DCI format may be used. Furthermore, one resource may be available, or the terminal apparatus, which is notified of a plurality of candidate resources, may select the source used for the data transmission, from the candidate resources. The terminal apparatus receives a transmission parameter in a case where the periodic data transmission in the M2M is performed, and retains the received transmission parameter in the transmission parameter storage unit 110. In a case where the transmission data occurs, the terminal apparatus performs the data transmission based on the transmission parameter retained in the transmission parameter storage unit 110, using a resource for the subframe periodically allocated (S301). A method of deciding the transmission power in the transmit power control unit 104 of the terminal apparatus will be described below. The base station apparatus detects the data transmitted by the terminal apparatus, and transmits the ACK/NACK indicating whether or not there is an error in the data detected in the subframe that appears 4 msec after the subframe in which the data signal is received (S302). Next, in the case where the transmission data occurs, the terminal apparatus performs the data transmission with the resource for the subframe that is periodically allocated (S303). The base station apparatus receives the data signal, and transmits the ACK/NACK, in a subframe that is 4 msec later (S304). As described above, the periodic data transmission in the M2M is realized.

Figure 12:
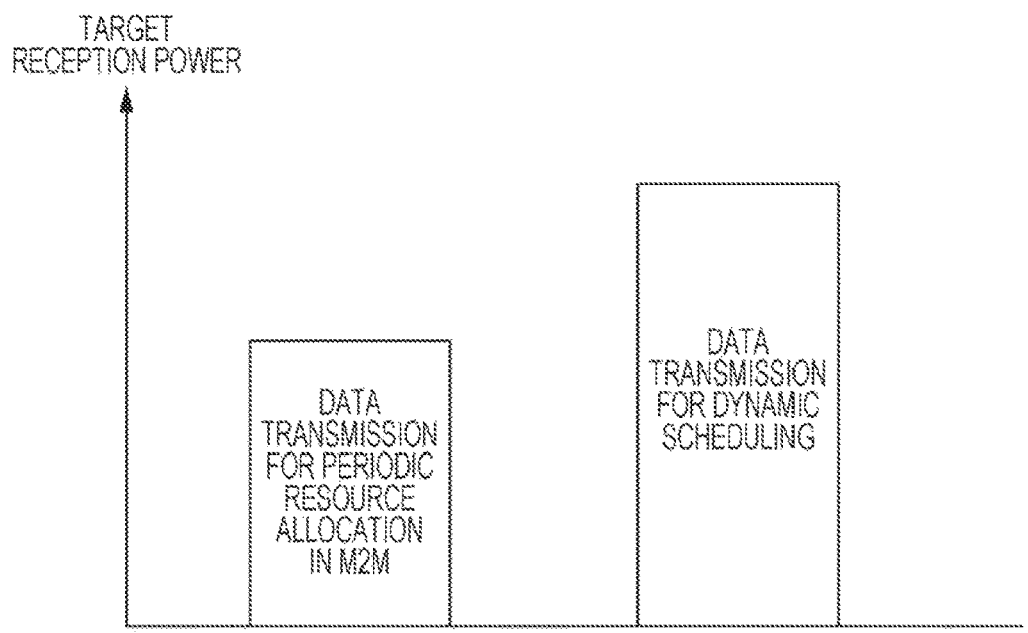
FIG. 12 is a diagram illustrating an example of the target reception power according to the present invention.

Operation of the transmit power control unit 104 of the terminal apparatus according to the present embodiment is described. An example of a configuration of a target reception power according to the present embodiment is illustrated in FIG. 12. First, it is preferable that because the terminal apparatus that performs the M2M communication is requested to consume low power, the periodic data transmission is realized at a lower transmission power. In FIG. 12, the periodic data transmission in the M2M communication is configured to be at a lower target reception power than the data transmission in the dynamic scheduling. For the M2M communication, transmission of a smaller amount of data than in the dynamic scheduling is assumed, and a high-rate MCS may not be used. Accordingly, the target reception power is lowered and thus communication is possible with a low-rate MCS. Thus, the M2M communication that has low power consumption can be realized.

Specifically, as the example of the configuration of the target reception power, as in the first or second embodiment, the target reception power can be changed depending on whether or not the data transmission is the periodic data transmission in the M2M communication. For example, j=3 may be defined for the transmission mode for the M2M communication as in the first embodiment and the configuration of the target reception power in FIG. 12 may be realized. In this case, $P_{O\_PUSCH,c}(j)$ in a case where j=3 in the M2M communication becomes lower than $P_{O\_PUSCH,c}(j)$ in a case where j=1 in the dynamic scheduling. Furthermore, as in the second embodiment, β or the like is introduced and thus the configuration of the target reception power in FIG. 12 may be realized. In this case, in the dynamic scheduling, β=1, and in the M2M communication, β≤1.

Figure 13:
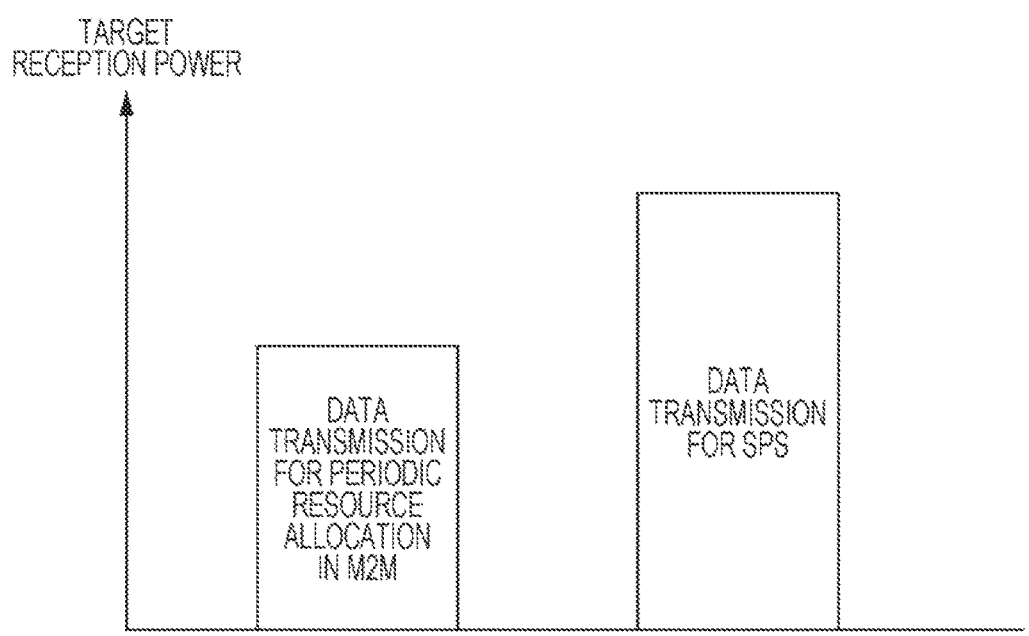
FIG. 13 is a diagram illustrating an example of the target reception power according to the present invention.

In the present embodiment, the target reception power for periodic M2M communication becomes lower than the target reception power for the dynamic scheduling, but the target reception power for the periodic M2M communication, as illustrated in FIG. 13, may be lower than the target reception power for the SPS.

Furthermore, the present embodiment is not limited to the example in which the target reception power is lowered, and $P_{PowerClass}$ may be changed with the transmission mode for the periodic M2M communication and the transmission mode for the dynamic scheduling or the SPS. For example, $P_{PowerClass}$ with the transmission mode for the periodic M2M communication is reduced to be lower than $P_{PowerClass}$ with the transmission mode for the dynamic scheduling or the SPS. Furthermore, $P_{CMAX,c}(i)$ may be changed with the transmission mode for the periodic M2M communication and the transmission mode for the dynamic scheduling or the SPS. For example, $P_{CMAX,c}(i)$ in the transmission mode for the periodic M2M communication is reduced to be lower than $P_{CMAX,c}(i)$ in the transmission mode for the dynamic scheduling or the SPS.

Furthermore, the present embodiment is not limited to the example in which the target reception power is lowered, and as in the second embodiment, the transmission power may be changed with the transmission mode for the periodic M2M communication and the transmission mode for the dynamic scheduling or the SPS, with $P_{O\_PRI,c}(I_{PRI})$. In this case, in the dynamic scheduling or the SPS, $P_{O\_PRI,c}(I_{PRI})$=0, and in the transmission mode for the periodic M2M communication, $p_{O\_PRI,c}(I_{PRI})$<0.

In the present embodiment, an example is described in which the target reception power in the transmission mode for the periodic M2M communication is reduced to be lower than the target reception power for the dynamic scheduling or the SPS, but the target reception power in the transmission mode for the periodic M2M communication may be reduced to be lower than the target reception power for the RACH.

In the present embodiment, an example is described in which the target reception power in the transmission mode for the periodic M2M communication is reduced, but the transmission mode may be determined according to an amount of resources allocated. For example, in a case where the amount of resources allocated is 1 RB, the determination as the transmission mode for the periodic M2M communication is made, and in a case where the amount of resources allocated is equal to or more than 2RB, the determination as the dynamic scheduling or the SPS is made.

As described above, in the present embodiment, in the transmission mode for the periodic M2M communication and the transmission mode for the dynamic scheduling or the SPS, different transmit power controls are applied, and the transmission power for the data transmission in the periodic M2M communication is reduced. As a result, the power consumption by the terminal apparatus in the transmission mode for the periodic M2M communication can be decreased.

A program running on the base station apparatus and the terminal apparatus according to the present invention is a program (a program for causing a computer to operate) that controls a CPU and the like in such a manner as to realize the function according to the embodiments of the present invention, which are described above. Then, information handled in the apparatuses is temporarily accumulated in a RAM while being processed. Thereafter, information is stored in various ROMs or HDDs, and if need arises, is read by the CPU to be modified or written. Any of a semiconductor medium (for example, a ROM, a nonvolatile memory card, or the like), an optical recording medium (for example, a DVD, a MO, a MD, a CD, a BD, or the like), a magnetic recording medium (for example, a magnetic tape, a flexible disk, or the like), and the like, may be used as a recording medium on which the program stored. Furthermore, in some cases, the functions according to the embodiments, which are described above, are realized by executing the loaded program, and in addition, the functions according to the present invention are realized by performing processing in conjunction with an operating system or other application programs, based on an instruction from the program.

Furthermore, in a case where the programs are distributed on the market, the programs, each of which is stored on a portable recording medium, can be distributed, or can be transmitted to a server computer connected through a network, such as the Internet. In this case, a storage apparatus of the server computer also falls within the scope of the present invention. Furthermore, one or several portions of or all portions of each of the base station apparatus and the terminal apparatus according to the embodiments, which are described above, may be realized as an LSI that is a typical integrated circuit. A functional block of each of the base station apparatus and the terminal apparatus may be individually built into a chip, or one or several functional blocks, or all functional blocks may be integrated into a chip. Furthermore, a circuit integration technique is not limited to the LSI, and an integrated circuit for the functional block may be realized as a dedicated circuit or a general-purpose processor. In a case where each of the functional blocks is integrated into a circuit, an integrated circuit control unit is added that controls the functional blocks.

Furthermore, a circuit integration technique is not limited to the LSI, and ah integrated circuit for the functional block may be realized as a dedicated circuit or a general-purpose processor. Furthermore, if, with advances in semiconductor technology, a circuit integration technology for a circuit with which an LSI is replaced will appear, it is also possible that an integrated circuit to which such a technology applies is used.

Furthermore, the present invention is not limited to the embodiments described above. Furthermore, application of the terminal apparatus according to the invention in the present application is not limited to a mobile station apparatus. It goes without saying that the terminal apparatus can be applied to a stationary-type electronic apparatus that is installed indoors or outdoors, or a non-movable-type electronic apparatus, for example, an AV apparatus, a kitchen apparatus, a cleaning or washing machine, an air conditioner, office equipment, a vending machine, and other household apparatuses.

The embodiments of the invention are described in detail above referring to the drawings, but the specific constitution is not limited to the embodiments and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments also fall within the technical scope of the present invention. Furthermore, a constitution in which a constituent element that achieves the same effect is substituted for the one described above according to each embodiment described above also falls within the technical scope of the present invention.

Moreover, the present international application claims the benefits of Japanese Patent Application No. 2015-003770 filed on Jan. 13, 2015, and the entire contents of Japanese Patent Application No. 2015-003770 are incorporated herein by reference.

REFERENCE SIGNS LIST

10 BASE STATION APPARATUS
21 TO 25 TERMINAL APPARATUS
101 TRANSMISSION SIGNAL GENERATION UNIT
102 TRANSMISSION SIGNAL ALLOCATION UNIT
103 IFFT UNIT
104 TRANSMIT POWER CONTROL UNIT
105 TRANSMISSION PROCESSING UNIT
106 TRANSMIT ANTENNA
107 RECEIVE ANTENNA
108 WIRELESS RECEPTION UNIT
109 CONTROL INFORMATION DETECTION UNIT
110 TRANSMISSION PARAMETER STORAGE UNIT
111 TRANSMISSION MODE DETERMINATION UNIT
1011 ERROR CORRECTION CODING UNIT
1012 MODULATION UNIT
1013 DFT UNIT
1014 REFERENCE SIGNAL MULTIPLEXING UNIT
1015 REFERENCE SIGNAL GENERATION UNIT
1016 CONTROL SIGNAL MULTIPLEXING UNIT
1017 CONTROL SIGNAL GENERATION UNIT
201-1 TO 201-N RECEIVE ANTENNA
202-1 TO 202-N RECEPTION PROCESSING UNIT
203-1 TO 203-N FFT UNIT
204-1 TO 204-N SIGNAL DEMULTIPLEXING UNIT
205 SIGNAL DETECTION UNIT
206 CHANNEL ESTIMATOR
207 CONTROL INFORMATION GENERATION UNIT
208 CONTROL INFORMATION TRANSMISSION UNIT
209 TRANSMIT ANTENNA
2041 REFERENCE SIGNAL DEMULTIPLEXING UNIT
2042 CONTROL INFORMATION DEMULTIPLEXING UNIT
2043 ALLOCATION SIGNAL EXTRACTION UNIT
2044 CONTROL INFORMATION DETECTION UNIT
2051 CANCELLATION PROCESSING UNIT
2052 EQUALIZATION UNIT
2053-1 TO 2053-U IDFT UNIT
2054-1 TO 2054-U DEMODULATION UNIT
2055-1 TO 2055-U DECODING UNIT
2056-1 TO 2056-U SYMBOL REPLICA GENERATION UNIT
2057 SOFT REPLICA GENERATION UNIT

The invention claimed is:

1. A transmission apparatus that transmits a data signal to a reception apparatus, comprising:
a control information reception unit that receives control information which is transmitted on a Physical Downlink Control Channel (PDCCH) or an Enhanced Physical Downlink Control Channel (EPDCCH) from the reception apparatus;
a control information transmission unit that transmits an Scheduling Request (SR) that requests the control information;
a transmission mode selection unit that selects a transmission mode for the data signal; and
a transmit power control unit that configures a transmission power for the data signal, wherein
the transmission mode includes a first transmission mode in which the control information is received on the PDCCH or the EPDCCH in the control information reception unit, and the data signal based on a transmission parameter included in the control information is transmitted, and a second transmission mode in which the control information is not received on any one of the PDCCH and the EPDCCH, and the data signal is transmitted without the reception apparatus being notified of a transmission timing of the data signal, and
in a case where transmission of the SR is possible and data transmission is possible with the first transmission mode and the second transmission mode, the transmission apparatus configures a first transmission power for the first transmission mode and a second transmission power for the second transmission mode.

2. The transmission apparatus according to claim 1, wherein the transmission parameter includes at least one of frequency resource allocation used for transmission of the data signal, a modulation scheme, a coding rate, retransmission information, and a cyclic shift of a demodulation reference signal.

3. The transmission apparatus according to claim 1, wherein the second transmission power for the second transmission mode is higher than the first transmission power for the first transmission mode.

4. The transmission apparatus according to claim 3, wherein a target reception power for the second transmission mode is higher than a target reception power for the first transmission mode.

5. The transmission apparatus according to claim 1, wherein in the first transmission mode, the data signal is periodically transmitted, and in the second transmission mode, the data signal is aperiodically transmitted.

6. The transmission apparatus according to claim 5, wherein a plurality of transmission powers are configurable in the second transmission mode, and the second transmission power is configured in accordance with QoS of the data signal aperiodically transmitted.

7. The transmission apparatus according to claim 1, wherein more frequency resources are used in the second transmission mode than in the first transmission mode.

8. The transmission apparatus according to claim 7, wherein a total transmission power for all frequency resources that are used for the transmission of the data signal in the second transmission mode is higher than a total transmission power for all frequency resources that are used for the transmission of the data signal in the first transmission mode.

* * * * *